July 12, 1932.  A. H. RAUBVOGEL  1,867,029
HANDLE FOR BAKERS' PEELS
Filed April 17, 1931
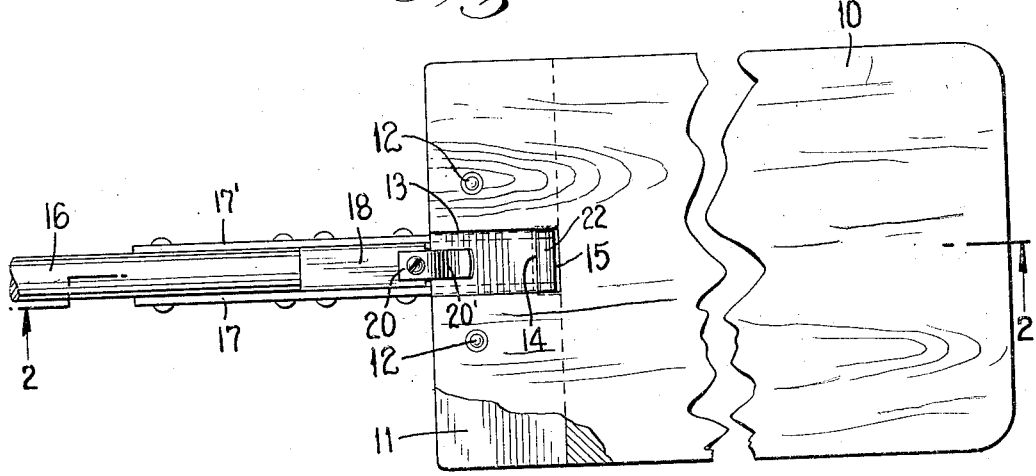
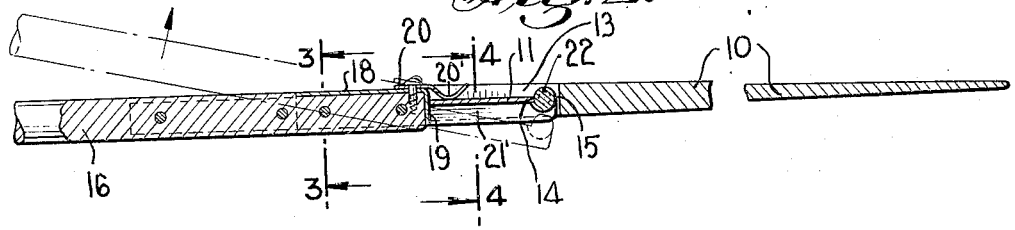
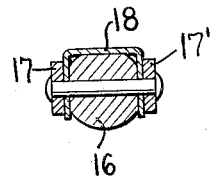 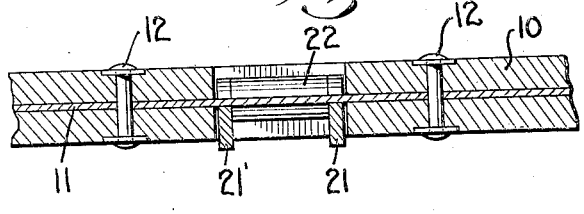
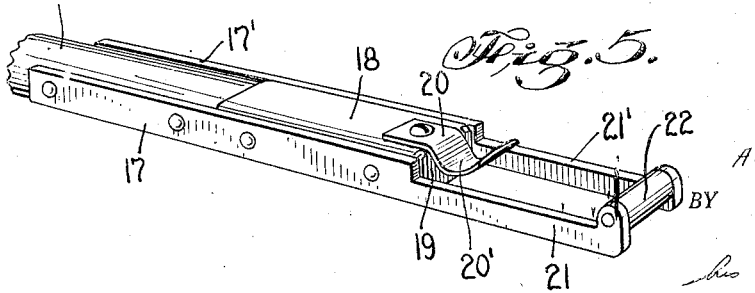
INVENTOR.
Abraham H. Raubvogel
BY
ATTORNEY Patented July 12, 1932

1,867,029

UNITED STATES PATENT OFFICE

ABRAHAM H. RAUBVOGEL, OF NEW YORK, N. Y.

HANDLE FOR BAKERS' PEELS

Application filed April 17, 1931. Serial No. 530,800.

This invention relates to improvements in bakers' peels, being particularly directed to a novel form of peel handle adapted for use with the so-called slotted type of reversible peel board.

Broadly, it is an object of this invention to provide for a baker's peel wherein the handle associated therewith has two gripping surfaces at opposite ends of the portion thereon serving to form the socket for the metallic attaching plate disposed at one end of the peel board, one of said gripping surfaces being rigid and the other being resilient, the rigid gripping surface being adapted to project through the slot formed in the peel board adjacent one face of the metallic attaching plate and the resilient gripping member being adapted to rest upon and press against the top of the metallic attaching plate at the other end thereof, to provide for a positive yet separable attachment of the peel board to the peel handle.

Specifically, it is an object of this invention to provide for a novel form of handle carrying a socket portion having disposed at opposite ends thereof, rigid and resilient gripping members for grasping the metallic attaching plate disposed within the peel board at the slotted portion of the same, wherein the handle is interlocked with the metallic attaching plate by means of the contact of the resilient gripping member on the top surface of one end of the metallic attaching plate and the pressure exerted at the opposite end of the metallic attaching plate by the rigidly disposed gripping member passing through the slotted portion of the peel board adjacent such other end of the metallic attaching plate; so that the metallic attaching plate which is fixed to the peel board is carried in a socket formed by the portion of the handle defined between the rigid and resilient gripping members thereof.

Further, it is an object of this invention to provide for a handle in baker's peels capable of gripping and becoming positively attached to the metallic attaching plate disposed in the slotted peel board irrespective of which side of the peel board is used.

Still further, it is an object of this invention to provide for a handle for peel boards wherein the gripping members associated with the socket portion thereof adapted to carry the metallic attaching plate disposed with the peel board are so arranged as to permit the peel handle to be attached to the peel board, that is, to the metallic attaching plate fixed to the peel board by sliding the handle so that the rigidly disposed gripping member passes under the metallic attaching plate while the resilient gripping member rests upon and presses against the upper surface of one end of the metallic attaching plate until the rigidly disposed gripping member passes through the aperture in the peel board adjacent the end of the metallic attaching plate and is adapted to cause the metallic attaching plate to rest in the socket portion, the rigidly disposed gripping member defining one end of the socket and the resilient gripping member forming the other defining element with respect to said socket, thereby to cause the peel board, once the handle has been disposed in position, to form a part of a unitary structure with the handle capable of being displaced, the said peel handle being removable from the peel board by exerting a pressure against the resilient gripping member to permit the downward displacement of the socket and the rigidly disposed gripping member, and then the lateral displacement of the handle carrying the socket and gripping members away from the metallic attaching plate.

These and other advantages, capabilities, and features of the invention will appear from the subjoined detail description of one specific embodiment therefor illustrated in the accompanying drawing, in which Figure 1 is a plan view of a peel showing the common type of peel board and the specific peel handle forming the invention herein.

Figure 2 is a side elevation in section taken along lines 2—2 of Figure 1.

Figure 3 is an elevation in section taken along lines 3—3 of Figure 3.

Figure 4 is an end elevation in section taken along line 4—4 of Figure 2.

Figure 5 is a perspective view of the peel handle forming the subject matter of this invention.

Referring to the reference characters in the drawing, numeral 10 represents a peel board of the customary shingle-like configuration, which peel board is slit at its thicker end portion and has inserted therein the metallic attaching plate 11 which is fastened thereto by means of bolts 12. The peel board at its thicker portion has formed a rectangular slot 13 for passage therethrough and retention of a portion of the attaching plate, the attaching plate being cut out as at 14 to provide for a rectangular slot as at 15 within the peel board, through which there may pass the rigid gripping element of the peel handle to be later described.

The peel handle comprises a wooden or metallic element 16 having a plurality of bars 17 and 17' bolted or riveted through, and a U-shaped bar 18 carried thereon and supported by means of bolts between the bars 17 and 17'. The U-shaped bar 18 has a depending projection 19 disposed so as to form an enclosing element with bars 17, 17' and 18 for the rod 16 and at the same time provide for a surface to resist the wear of one end of the metallic attaching plate 11. To the upper surface of the U-shaped bar 18 there is fastened as by being screwed thereto the resilient tongue 20 having a U-shaped section 20', which serves to press against the metallic attaching plate and to form one of the gripping members therefor.

The bars 17 and 17' have U-shaped cut-out portions 21 and 21', which serve as the base and end walls to form the socket portion for carrying that portion of the metallic attaching plate disposed with the slot 13 in the peel board. A curved bar 22 is disposed between and fixed to the free ends of the bars 17 and 17' to provide the second or rigid gripping surface for the metallic attaching plate.

In operation, the handle shown in Figure 5 is applied to a peel board in the following manner. The socket portion of the handle is urged under the portion of the metallic attaching plate disposed in the slot 13 of the peel board, with the result that the upper surface of the metallic plate within the slotted portion of the peel board contacts with and urges upwardly the U-shaped portion 20' of the resilient gripping member 20, with the result that it is displaced upwardly as the handle is urged towards the peel board. When the end of the metallic attaching plate approaches the surface 19, and contacts with the surface 19 of the U-shaped bar 18, the portion of the metallic attaching plate within the slotted section 13 of the peel board is approximately in a position as to rest upon the upper surface of the U-shaped cut-out portions 21 and 21' of the bars 17 and 17', at which time bar 22 disposed at the extreme end of the handle is directly under the unfilled slotted portion 15 of the slot 13 and is adapted to project through such slotted portion as shown in Figure 2 and contact with and press against the free end of the metallic attaching plate therein disposed.

As will be seen from the disclosure herein, the metallic attaching plate rests within the U-shaped portions 21 and 21' of the bars 17 and 17' and is retained in such portion, due to the pressure exerted against the end thereof by rigid gripping member 22 and the pressure exerted against the top surface of the other end thereof by the resilient gripping member 20.

To remove the handle all that is necessary is to hold the peel board in position and displace the handle in the direction of the arrow (see the dotted lines in Figure 2) whereupon the rigid gripping member 22 drops out of the slotted portion 15 while the U-shaped portion 20' of the resilient gripping member still presses against the top of one end of the metallic attaching member; all that is necessary is to draw the handle to the left away from the peel board, as shown in Figure 2, until the handle and the peel board are separated.

Although the handle member is shown as formed of a series of plates and bars attached together, it is within the province of this invention to provide for a cast or moulded structure embodying all the elements of the handle with the exception of the resilient spring element which must, of necessity, be attached to the upper surface of the handle adjacent the U-shaped socket forming portion thereof.

It is to be noted that in view of the disposition of the metallic attaching plate substantially midway between the opposite ends of the thickened portion of the peel board, that the peel board may be used on either side and that the handle may be attached to the peel board by gripping that portion of the metallic attaching plate disposed in the slot 13 irrespective of the side of the peel board used.

It is obvious that various changes and modifications may be made to the details of construction without departing from the general spirit of the invention as set forth in the appended claims.

I claim:

1. In a baker's peel, a slotted peel board having an attaching plate fixed therein and extending across the slotted portion thereof, a handle cooperating with said peel board, said handle having a socket portion adapted to receive a section of the attaching plate disposed in the slotted portion of the peel board, the opposite extremities of said socket portion being bounded by respectively fixed and resilient gripping members acting against the surface of the specified section of said attaching plate, the resilient gripping member comprising a metallic stamping having a U- shaped surface for contacting a portion of the surface of the attaching plate.

2. In a baker's peel, a slotted peel board having an attaching plate fixed therein and extending across said slotted portion, and a handle cooperating with said peel board, said handle having a socket portion adapted to carry a section of the attaching plate disposed in the slotted portion of said peel board, and means defining opposite ends of the socket for gripping one end and the top surface of the attaching plate adapted to be carried in said socket, the gripping means for the top surface of the attaching plate being resilient, and having a U-shaped contacting portion.

3. In a baker's peel, a reversible slotted peel board having an attaching plate fixed therein disposed centrally at one end therein and extending across said slotted portion thereof, and a handle cooperating with said peel board, said handle having a socket portion upon which is adapted to rest a section of the attaching plate disposed within the slotted portion of said peel board, and a fixed gripping member defining one extremity of said socket and a resilient gripping member having a U-shaped contacting portion acting upon a portion of the surface of the attaching plate defining the other extremity of said socket, said gripping members being adapted to separably interlock the attaching plate and the peel board, of which it forms a part with the handle.

4. In a baker's peel, a slotted peel board having an attaching plate disposed therein and passing through the slotted portion thereof, and a handle having a socket portion in which is adapted to rest a section of the attaching plate disposed in the slotted portion of the peel board, a fixed gripping member defining one extremity of said socket adapted to pass through the slotted portion of said peel board and grip one end of the section of the attaching plate disposed therein, and a resilient gripping member defining the other extremity of said socket and comprising a metallic stamping having a U-shaped contacting portion, the said contacting portion of said resilient gripping member being adapted to slide along and press upon the upper surface of the section of the attaching plate disposed in the slotted portion of the peel board, said handle and peel board being reversibly attachable.

ABRAHAM H. RAUBVOGEL.